United States Patent [19]

Fisli

[11] 4,021,897
[45] May 10, 1977

[54] PROCESS FOR PROVIDING CEMENTED GLASS FLATS TO PROVIDE HIGH SPEED MULTI-FACETED POLYGONAL SCANNERS

[75] Inventor: Tibor Fisli, Los Altos Hills, Calif.

[73] Assignee: Xerox Corporation, Stamford, Conn.

[22] Filed: May 19, 1976

[21] Appl. No.: 687,848

[52] U.S. Cl. ............................ 29/25.13; 156/272
[51] Int. Cl.² ........................................ H01J 9/18
[58] Field of Search ....... 156/272; 29/25.11, 25.13; 350/6, 7

[56] References Cited
UNITED STATES PATENTS 3,287,197  11/1966  Errede .............................. 156/272
3,529,884  9/1970  Ives et al. ......................... 350/6 X
3,657,792  4/1972  Hug et al. ......................... 350/7

Primary Examiner—Richard B. Lazarus
Attorney, Agent, or Firm—M. J. Colitz; T. J. Anderson; A. W. Karambelas

[57] ABSTRACT

Precisely prefabricated glass plates are cemented on a precisely machined aluminum polygon employing ultraviolet sensitive cement. Each glass plate is aligned precisely and then fixed in place by application of U-V radiation which fixes the cement and thereby permanently affixes the glass plate to the aluminum polygon. Methods of employing this scanning system in flying spot scanning applications are also disclosed.

3 Claims, 3 Drawing Figures

PROCESS FOR PROVIDING CEMENTED GLASS FLATS TO PROVIDE HIGH SPEED MULTI-FACETED POLYGONAL SCANNERS

BACKGROUND OF THE INVENTION

Multi-faceted scanners usually comprising multi-faceted rotating mirrors are employed in well known techniques for erecting optical scanning between a light source and a photocell. Typically, a light illuminates a silvered mirror, for example, at an angle of 45° to direct light toward a facet that is reflected from the facet toward the object being scanned. Normally the object reflects this light back along the same path upon a photocell. The duration of the scan corresponds to the time for a facet to pass the light beam along the object being scanned. It is usually preferred that the object path scanned is independent of which facet is then in the light beam path.

In connection with television equipment, it is known to use mirror prisms for image scanning along one dimension, usually for line scanning. Since the advent of television, cameras operating in accordance with the image storage system, the need for such mirror prisms has become greatly increased. Recently television cameras have been designed for operation within the infrared radiation range, for example, within the range of 2 to 5.5 microns. Television cameras operating within this wave-length require mirrors or similar light deflecting optical means for scanning an image. Usually one means, for instance, a light deflecting mirror, is used for vertical scanning image division. Rotary mirror prisms which are generally prisms composed of several plane mirrors such as glass mirrors are conventionally employed by suitably mounting them on a shaft or other rotary support. These mechanically composed rotary prisms are found to have many disadvantages, both as to their optical characteristics and their mechanical reliability. In particular, they have been found mechanically difficult to mount the several planed mirrors so that they accurately form a polygonal shape of predetermined dimensions. For short optical path lengths, slight misalignment of the facets is found to be of little practical significance. However, when the distance between the scanning mirror and the object being scanned is many feet, slight misalignment of the facets results in the path of scan changing from one facet to the other. Such a result is especially disadvantageous when scanning labels with an encoded stripe arrangment. If there is misalignment of the facets one facet might make a perfect scan of the coded stripes while the next facet would register no scan at all or only scan a few of the stripes.

Morever, it is difficult to mount the mirrors so that they accurately retain their spatial positions when subjected to the stresses of high speed rotation. The last mentioned mounting problem entails a danger of injury to persons close to the spinning mirror prism which is often unavoidable. Obviously when the mirror prism should disintegrate shrapnel is produced which may cause serious injury to a bystander.

Thus, many methods have been investigated to produce multi-faceted scanners so that the materials from which they are composed would have high modulus to density ratio, low thermal expansion, low Poisson's ratio, good workability and possess the ability to be readily polishable or coatable with a substance which in turn can be polished to produce high quality optical surfaces. Unfortunately, the imposition of these material restrictions result in the requirement of a material which is not readily available. Presently, in view of these material restrictions and limitations, scanners are now being manufactured from glass, stainless steel, beryllium and chromium carbide. The latter two materials are the most widely used since they more nearly meet the requirements of the predicated material limitations. Of these two, beryllium is found to best satisfy the material requirements of the predicated material limitations and consequently is found to perform in a superior fashion when employed. However, the use of beryllium to provide multi-faceted scanners in and of itself results in still other problems among which are exorbitant cost of the material and the extreme difficulty of working the material into the desired configurations. Chromium carbide scanners, although not as expensive as beryllium scanners, possess very high density and therefore require in the overall general construction of the scanner a driver motor and bearings which are much heavier and much more costly to provide.

There is therefore a demonstrated need to provide multi-faceted scanner systems which may be precisely machined, inexpensively, and with great facility than known scanner systems enabling these multi-faceted scanners to be considered for employment in a vast number of applications other than military or development laboratories where the exorbitant costs of currently available scanner systems can only be justified.

It is therefore an object of this invention to provide a novel multi-faceted scanning system devoid of the above noted deficiencies.

It is another object of this invention to provide a novel multi-faceted scanner system characterized by precise alignment of the facets.

Another object of this invention is to provide a novel scanning system which achieves precise alignment of the different facets with techniques that are relatively easy to perform.

These and other objects of the instant invention are accomplished, generally speaking, by providing precisely prefabricated glass plates which are cemented on a precisely machined aluminum polygon employing ultraviolet sensitive cement. The ultraviolet cement employed to hold the facets to the polygon possesses a viscosity which allows the facet to be properly maneuvered and aligned to the desired angular position. When this position is obtained, the cement is immediately exposed to ultraviolet radiation which instantly sets the cement and as a result permanently provides the precise angular position required. Fabrication of the polygonal glass facet scanner may be completed by coating with a reflective coating of aluminum and a protective coating of silicon monoxide.

Although the Bohn et al. patent, U.S. Pat. No. 3,040,627 teaches that a rotatable mirror may be made by adhesively securing optically flat glass segments or facets onto an aluminum polygon base, Bohn et al suggests the use of a standard epoxy based adhesive for securing the facets. It would be extremely difficult employing the process of Bohn et al if at all possible to obtain the precise angular position as obtained when applying ultraviolet cement as in the system of the instant invention.

Furthermore, it is preferred that the aluminum alloy employed is a specific aluminum alloy heretofore not employed in the prior art for high speed scanning systems. This alloy is found to possess the following properties which specifically provide a very useful material in the fabrication of polygonal high speed scanners:

7075-T651 ALUMINUM ROD

This alloy is recommended when extra strength and hardness are required. It is used primarily for aircraft and ordinance applications.

| Nominal Chemical Composition | | |
|---|---|---|
| Zinc | 5.6% | |
| Magnesium | 2.5% | |
| Copper | 1.6% | |
| Chromium | 0.3% | |
| Aluminum | Balance (incl. normal impurities) | |
| Typical Mechanical Properties | Tensile Strength, psi | 83,000 |
| | Yield Strength, psi | 73,000 |
| | Elongation, % in 2" | 11 |
| | Shear Strength, psi | 48,000 |
| | Brinell Hardness 10/500 | 150 |
| Typical Physical Properties | Density, Lbs./Cu. In. | 0.101 |
| | Melting Range, approx. °F | 890–1180 |
| | Electrical Conductivity, % IACS at 20° C (68° F) | 33 |
| | Thermal Conductivity, btu at 25° C (77° F) | 900 |
| | Average Coefficient of Thermal Expansion at 68° to 212° F | 0.0000131 |

| Fabricating Performance | |
|---|---|
| Cold Forming: | Poor |
| Machining: | Good |
| Brazing: | Not Suitable |
| Welding: | |
| Arc, | Poor |
| Gas, | Poor |
| Resistance, | Good |

| Government & Industry Specifications | | |
|---|---|---|
| | Cold Finish-Rolled | Extruded |
| A.M.S. | 4122c, 4123A | 4154F, 4168A, 4169B |
| A.S.T.M. | B211 | B221 |
| Federal | QQ-A-225-9b (QQ-A-282) | QQ-A-200/11b (QQ-A-277) |
| Military | None | None |
| S.A.E. | AA7075 | AA7075 |

The general concept of the instant invention having been described, the specifics of the system of the instant invention will be more specifically defined in terms of the drawings which follow of which:

Figure 1:
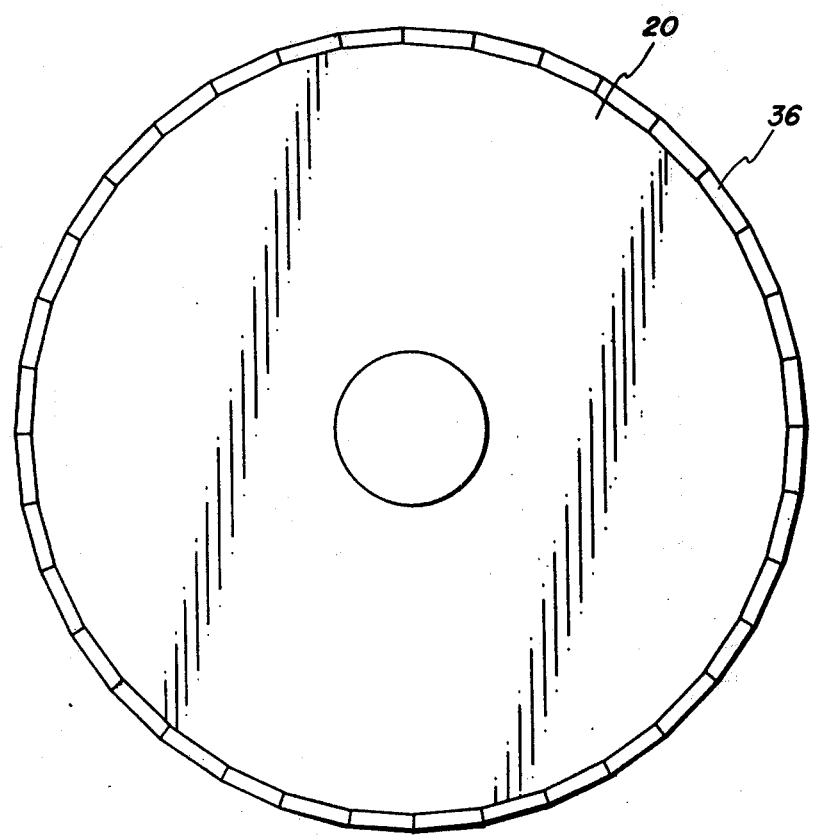
FIG. 1 illustrates a plain view of the glass faceted polygonal scanner.

In FIG. 1 is seen a precisely machined aluminum alloy high speed scanning polygon 20 fabricated of the specific aluminum alloy recited above. The polygon is machined employing conventional techniques which include turning and milling. To the polygon are cemented glass plates 36 applying UV sensitive cement coated on the polygon of FIG. 1. The adhesive layer comprises any suitable UV sensitive cement 21. The glass plates 36 are then applied as above and furnished with a vacuum coating of aluminum and a coating of silicon monoxide not shown. Typical UV sensitive cements include UV-71 by Summers Laboratories, Inc.

Figure 3:
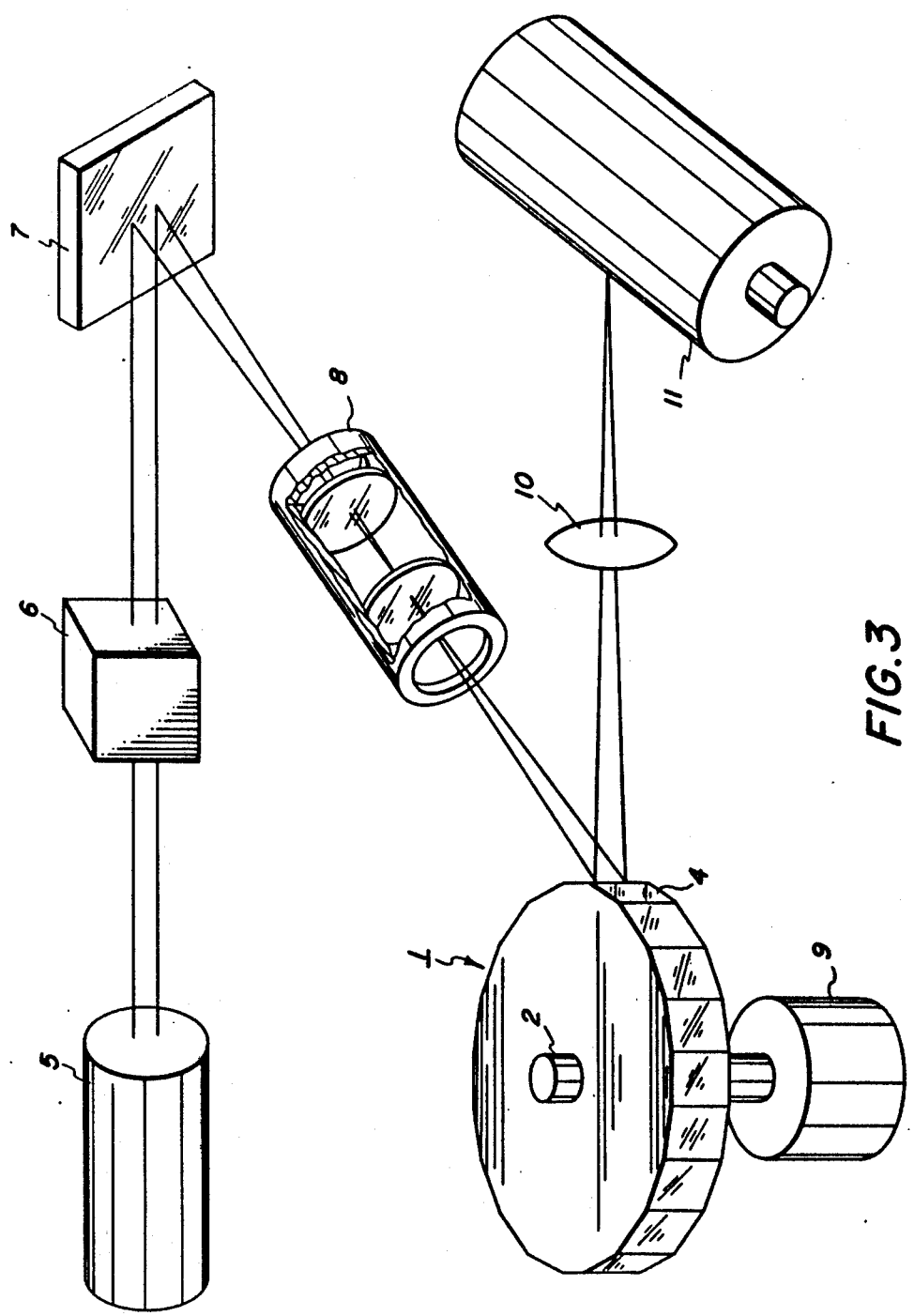
FIG. 3 illustrates a conventional scanning system in which the polygonal scanner of FIG. 1 may be employed.

In FIG. 3 a laser 5 emits light through a modulator 6 which is reflected by a mirror 7 to a beam expander 8. The expanded beam impringes on the scanner facets 4 which are rotated at high speed by motor 9. The scanned beam then passes through a focusing lens 10 and is directed to the photoreceptor surface 11.

Figure 2:
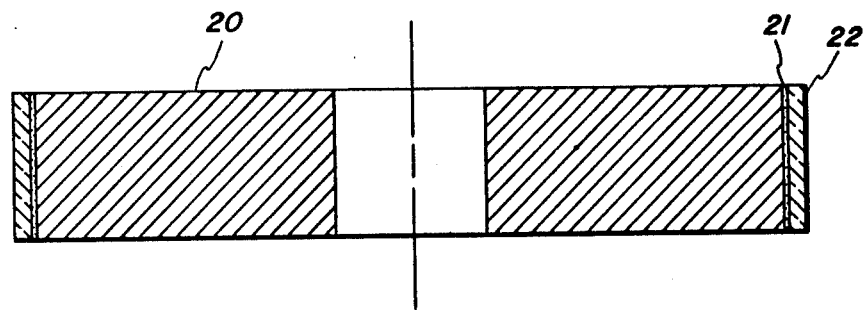
FIG. 2 illustrates a sectional view of the precisely machined aluminum polygon of FIG. 1.

The cementing technique may comprise any suitable method. Typical techniques include application by hypodermic needle, brushing automated pressurized application and gravity feed. Of these application by hypodermic needle is preferred since it provides better control and more nearly satisfies the requirements of the system of the instant invention. To the cemented polygon of FIG. 2 are applied precisely prefabricated glass plates which have been positioned in place. These precisely prefabricated glass plates may be provided employing any suitable conventional technique. Suitable techniques for precisely prefabricating such glass plates include preparing suitably sized parallel plates with required thickness and flatness and cutting them up to the desired size employing conventionally known techniques. The conventional blocking technique which includes securing the cut up facets on a flat plate with wax prepares the facets for subsequent polishing.

To the polygon of FIG. 2 are applied prefabricated glass plates which have been properly positioned employing any typical conventional technique for properly aligning glass plates including the use of a precise rotary table having a resolution of 1 second of arc to which the aluminum polygon is mounted so that their respective axes coincide. An autocollimator positioned substantially normal to the place of the facet is energized to provide a beam of light which precisely reflects back to the collimator along the path of emission when the facet has been aligned perfectly normal to the beam. After each facet is precisely aligned it is exposed to activating ultraviolet radiation to permanently position it in place. The precisely aligned glass facets are permanently fixed employing any suitable source of UV radiation. Typical sources of UV radiation include high pressure, high temperature quartz iodine lamp, xenon, and mercury arc lamps.

The high speed scanning system thus provided may be employed in any suitable high speed scanning configuration. In FIG. 3 a typical high speed scanning system is seen which employs the multi-facet polygon scanner provided by the process of the instant invention. A laser 5 emits light through a modulator 6 which is reflected by a mirror 7 to a beam expander 8. The expanded beam impringes on the scanner facets 4 which are rotated at high speed by motor 9. The scanned beam then passes through a focusing lens 10 and is directed to the photoreceptor surface 11. This scanning system is found to be operable at rotational speeds in excess of 100,000 rpms to provide a very precise and reproductive scan facet for facet. The method described may also be employed with great ease and facility in an economical and technically satisfactory manner. The scanners thus obtained were found not only to be accurate but also economical in their preparation and use.

Typical applications of this system include deflection of a light beam such as laser in such a manner that it produces a "flying spot." When this bright spot is moved across an object-document having high and low density areas by rotation of the scanner, a light detector (placed in the vicinity) provides an electronic signal which is low or non-existent when the spot is in a dark area, and high when the spot is in a light area of the document. This type of scanning system is used in facsimile devices and in optical character readers. Since this system can be used (in conjunction with other hard and software) to decode alpha numerics, it is also known as a "reader." Another system which also uses multi-faceted scanners is the so-called "write" system. The overall arrangement in general is the same except that in the stationary path of the beam (before the scanner) a light switch known as a modulator is used to "write" the image on a xerographic photoreceptor. The signal going into the modulator can come either from the light detector of the "read" station, or from a character generator which is the case with computer printers.

To further define the specifics of the present invention, the following examples are intended to illustrate and not limit the particulars of the present system. Parts and percentages are by weight unless otherwise indicated.

EXAMPLE I

An aluminum alloy 7075-T651 as before described is precisely machined into a polygonal configuration having the following dimensions: 24 facet, 2.860 inch dia. across facet and 0.375 inch thick. To each facet of the polygon is then coated with a layer of UV sensitive adhesive. Glass flats are prepared and cut up employing conventional techniques. The glass flats thus produced are placed over a UV sensitive cement adhesive coated on each facet of the polygon. The facets are precisely aligned and each held in place while exposed to UV radiation thus permanently affixing the facets. The operation of applying UV sensitive cement, applying the glass facet and exposing to UV radiation is performed facet by facet. The high speed scanner thus provided is placed into a conventional high speed light scanning system and is found to operate with great reproducibility at scanning speeds in excess of 100,000 rpms without noticeable distortion.

Although the present examples were specific in terms of conditions and materials used, any of the above listed typical materials may be substituted when suitable in the above examples with similar results. In addition to the steps used to carry out the process of the present invention other steps may be employed which will enhance, synergize, or otherwise desirably affect the properties of the system for their present use.

Anyone skilled in the art will have other modifications occur to him based on the teachings on the present invention. These modifications are intended to be encompassed within the scope of this invention.

What is claimed is:

1. A process of providing high speed multi-faceted polygonal scanners comprising providing a precisely machined aluminum polygon having a multiplicity of smoothly machined facet faces, applying ultraviolet sensitive cement to at least one face of said polygon, providing precisely prefabricated glass plates which conform to the faces of said polygon to the facet faces of said polygon, placing one of said glass plates on a facet face of the cement coated aluminum polygon, precisely adjusting the angularity of said glass plate, exposing said glass plated polygon to ultraviolet radiation in order to permanently affix the glass plate at the proper angularity and repeating each of the above steps until the polygonal scanner has been completely covered with glass plates at the proper angularity thus providing a high speed multi-faceted polygonal scanner.

2. The process as defined in claim 1 wherein said polygonal glass facet faces are further provided with a coating of aluminum followed by a coating of silicon monoxide.

3. The process as defined in claim 1 wherein the aluminum employed is a specific aluminum alloy designated as 7075-T651 having a tensil strength of 83,000 psi, a yield strength of 73,000 psi, and elongation % in 2 inch of 11, a shear strength of 48,000 psi, Brinell Hardness 10/500 of 150, a density of 0.101, a melting range of 890°–1180° F, an electrical conductivity % IACS 20° C (68° F of 33), a thermal conductivity and btu's at 25° C of 900 and an average coefficient of thermal expansion at 68° F to 212° F of 0.0000131.

* * * * *